Fig. 3

INVENTORS
GEORGE A. MANSFIELD JR.
WARREN H. COWLES
BY Whittemore,
Hulbert & Belknap
ATTORNEYS United States Patent Office 3,243,957
Patented Apr. 5, 1966

3,243,957
FUEL CONTROL
George A. Mansfield, Jr., Warren, and Warren H. Cowles, Birmingham, Mich., assignors to Holley Carburetor Company, Warren, Mich., a corporation of Michigan
Filed Aug. 6, 1962, Ser. No. 214,881
12 Claims. (Cl. 60—39.28)

The present invention relates to fuel controls and refers more specifically to apparatus for metering fuel at high pressure to turbine engines or similar devices in accordance with engine compressor discharge pressure at all engine speeds and modulating the metered fuel flow between maximum and minimum limits in response to fuel control drive and power turbine speed errors at any selected governing speed.

Metering apparatus for turbine engines and similar devices are known in which fuel is metered in accordance with engine speed and an engine parameter such as compressor pressure to maintain engine speed substantially constant at a selected governing engine speed and is metered in response to compressor pressure or similar engine parameter only during engine acceleration and deceleration. In this regard reference is made to the commonly owned prior filed patent applications Serial No. 143,880, filed October 9, 1961, now Patent No. 3,183,957, and Serial No. 198,158, filed May 28, 1962. These prior fuel controls are especially suited for low pressure applications wherein governing is desired only in accordance with a single parameter such as the fuel control drive speed.

It is one of the objects of the present invention to provide a fuel control for metering high pressure fuel to turbine engines or similar devices having a wide size range of for example between 300 and 4000 horse power.

Another object is to provide a fuel control for metering fuel at a relatively high pressure to a turbine engine or similar device including means for controlling the fuel metered to the engine in accordance with a selected engine parameter such as compressor discharge pressure at all times and means for modulating the metered fuel to govern the device between limits at any selected governing speed in accordance with a plurality of other parameters.

Another object is to provide a fuel control as set forth above wherein the governing parameters are fuel control drive speed and engine power turbine speed.

Another object is to provide a fuel control as set forth above wherein a positive delivery high pressure pump is utilized in conjunction with a series valve to provide operating pressures for the fuel control.

Another object is to provide a fuel control as set forth above including engine power turbine over temperature governor resetting apparatus.

Another object is to provide a fuel control as set forth above including adjustable means for setting different idle fuel requirement limits for variable engine operating conditions.

Another object is to provide a fuel control as set forth above including means for correcting the compressor discharge pressure to absolute pressure.

Another object is to provide a fuel control as set forth above including means for controlling the fuel metered to the engine in accordance with variations in the fuel.

Another object is to provide a fuel control as set forth above including cold start and low speed fuel metering compensating means.

Another object is to provide a fuel control as set forth above including an integral fuel cut-off control and manifold drain.

Another object is to provide a fuel control as set forth above including means for limiting the maximum compressor pressure of the engine usable to control the fuel metered to the engine.

Another obect of the invention is to provide a fuel control as set forth above wherein the governor reset apparatus includes means for preventing resetting of the governing apparatus below minimum engine idle fuel flow requirements.

Another object is to provide a fuel control as set forth above including means for accurately controlling the fuel metered to the engine only in accordance with compressor discharge pressure during both acceleration and deceleration of the engine.

Other objects and features of the invention will become apparent as the description proceeds especially when taken in conjunctiton with the accompanying drawings illustrating a preferred embodiment of the invention.

With particular reference to the drawings one embodiment of the invention will now be considered in detail.

Figure 1:
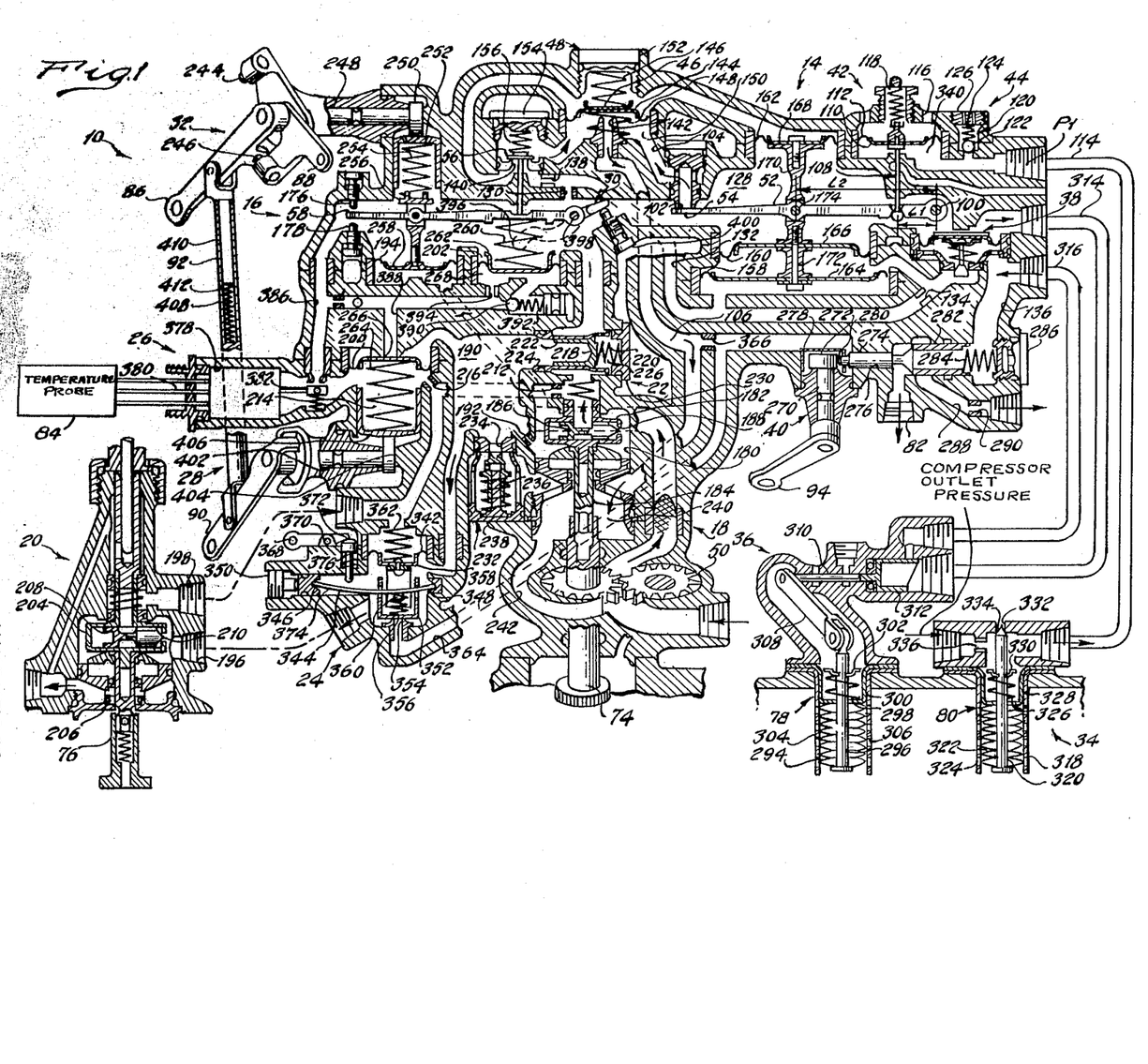
FIGURE 1 is a diagrammatic representation of a fuel control constructed in accordance with the invention.
Figure 2:
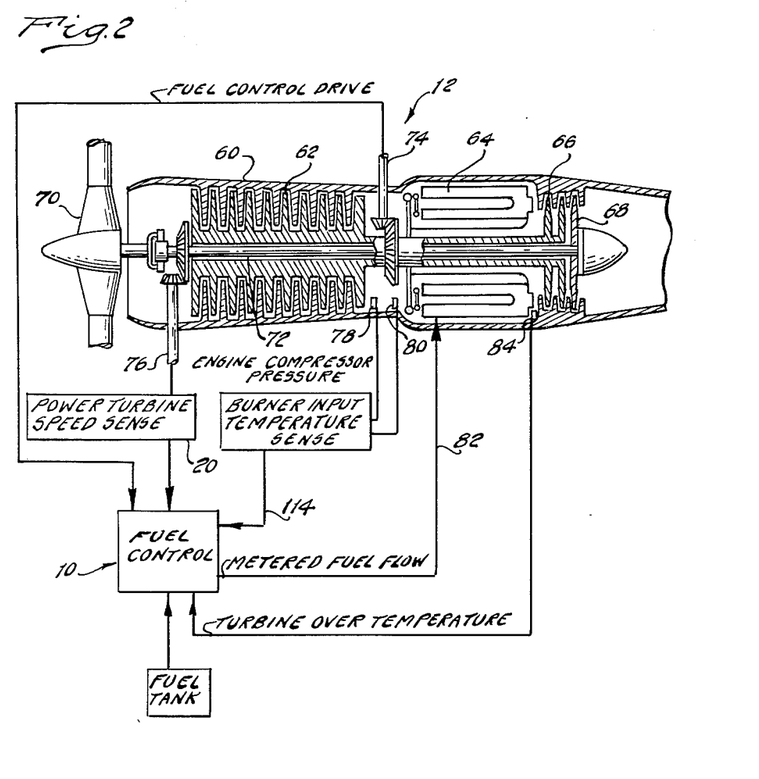
FIGURE 2 is a block diagram illustrating the fuel control of FIGURE 1 in conjunction with a turbine engine.
Figure 3:
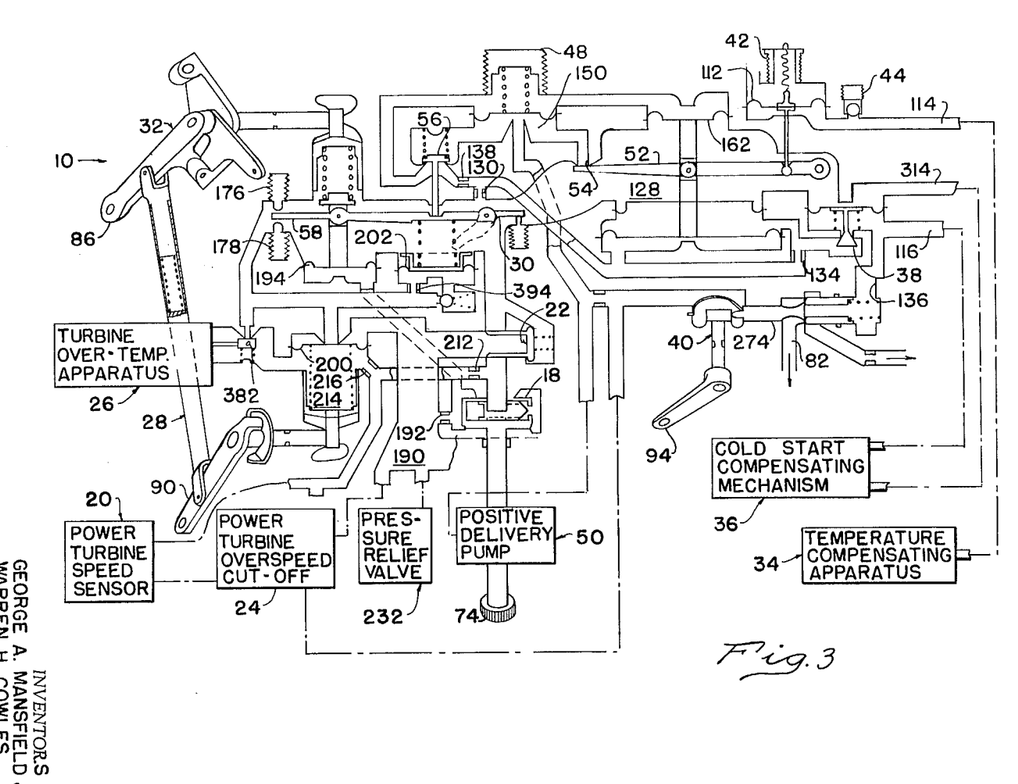
FIGURE 3 is a simplified drawing of the fuel control illustrated in FIGURE 1.

The fuel control 10 illustrated in FIGURE 1 is operable to meter fuel to the turbine engine 12 illustrated in FIGURE 2. Fuel control 10 includes the acceleration system 14 and the governing apparatus 16. Hydraulic speed sensors 18 and 20 are provided in conjunction with the series valve 22 to provide pressure differentials in accordance with fuel control drive speed and engine power turbine speed respectively. Power turbine over speed cut-off mechanism 24 and turbine over temperature apparatus 26, power turbine governing and maximum reset adjustment means 28 and 30 are also provided in conjunction with the governing apparatus 16 along with the governing speed selection mechanism 32.

Fuel control 10 is further provided with the temperature compensating apparatus 34 and the cold start compensating mechanism 36 operable in conjunction with the cold start and low speed throttle valve assembly 38. Engine cut-off and manifold drain structure 40 as well as structure for reducing compressor pressure to absolute pressure 42 and structure 44 for limiting the maximum compressor pressure effective on the fuel control 10, throttle valve assembly 46 and density compensating structure 48 complete the major components of the fuel control 10.

In operation fuel is pumped into the fuel control 10 by the positive delivery pump 50 always in excess of the requirements of the engine 12. The fuel requirements of engine 12 are sensed as a function of engine compressor pressure and the lever 52 in the acceleration system 14 is pivoted to open valve orifice 54 and feed back to the pump that portion of the pumped fuel not required by the fuel control 10. The amount of fuel bypassed back to the pump 50 through the throttle valve assembly 46 is further controlled by the governing apparatus 16 by positioning governing valve 56 in accordance with the position of governing lever 58 under the control of means 32 for selecting a governing speed and the speed sensor 18 operable to detect fuel control drive over speed and the speed sensor 20 operable to detect power turbine over speed.

Thus it will be evident that fuel is metered to the engine 12 through the fuel control 10 in accordance with the present invention as a function of engine compressor pressure at all times and at any selected governing speed the fuel metered to the engine is modulated in accordance with the fuel control drive speed and power turbine speed of the engine.

More specifically the engine 12 as best shown in FIGURE 2 includes the outer case 60 housing the air compressor 62, burner chambers 64, compressor turbine 66 and power turbine 68. As indicated diagrammatically the power turbine 68 may be connected to the load 70 by drive shaft 72. Heat exchanger means (not shown) may be incorporated in the engine 12.

The fuel control 10 as shown in FIGURE 2 is provided with six connections to the engine 12. Thus the fuel control drive shaft 74 is mechanically connected by a fuel control drive to the engine compressor 62 and compressor turbine 66 as indicated in FIGURE 2 for rotation therewith at fuel control drive speed. Similarly the drive means 76 of the speed sensor 20 is connected to the power turbine 68 for rotation at a speed proportional to the speed of the power turbine. In addition compressor discharge pressure and burner input temperature are sensed by means of the pressure and temperature probes 78 and 80 respectively which are operable between the engine 12 and fuel control 10 as will become more evident subsequently. Fuel is metered to the engine 12 through the fuel conduit 82 to the burners 64. Burner or turbine temperature is sensed by the temperature probe 84 to regulate the fuel fed to the burners 64 as will also become more evident subsequently.

Besides the external connections of the fuel control 10 to the engine 12 four external lever controls are provided on the fuel control 10 as shown in FIGURE 1. Lever 86 of the speed selection mechanism 32 permits setting of engine governing speed at any speed between an idle speed with the lever in a full down position as shown in FIGURE 1 and a maximum engine speed with the lever in a full up position corresponding to minimum and maximum fuel flows through the fuel control 10. Lever 88 which is also part of the speed selection mechanism 32 is provided to establish two idle positions for lever 86 to permit different idle fuel flows and conserve fuel in accordance with engine operating conditions such as the operating altitude of the engine.

Lever 90 which is secured to the lever 86 by the one-way linkage 92 is part of the power turbine governing means 28 and is provided to prevent resetting of the governing apparatus 16 below minimum idle setting for all positions of the lever 86 below the maximum fuel setting thereof as will become more evident subsequently on consideration of the resetting of the governing apparatus 16 on power turbine over temperature. Lever 94 is part of the engine fuel cut-off structure 40 and is operable to positively prevent metering of fuel to the engine 12 from the fuel control 10.

The acceleratiton system 14 includes the control lever 52 pivotally mounted at 100 and having a valving surface 102 at the opposite end thereof. The lever 52 is pivoted about the pivotal mounting means 100 to vary the opening of valving orifice 54 in accordance with the forces applied to the lever 52 whereby the fuel pumped by pump 50 in excess of the fuel required by the engine 12 and that bypassed in the governing action of the fuel control 10 is bypassed through the metering orifice 54, conduit 104 and the throttle valve assembly 46 back to the input side of the pump 50 through conduit 106.

The posititon of the lever 52 is controlled substantially in accordance with absolute engine compressor pressure at all times through the rod 108 connected between the lever 52 and the member 110 supported on diaphragm 112. Diaphragm 112 is exposed to compressor discharge pressure through conduit 114 on one side thereof and to atmospheric pressure through openings 116 on the opposite side thereof. The adjustable spring 118 is provided and is secured to member 110 to substantially balance the atmospheric pressure acting thereon. Thus the pressure acting on the diaphragm 112 and member 110 will be substantially the absolute compressor discharge pressure through conduit 114.

At all engine speeds therefore it will be seen that fuel is metered to the engine in accordance with absolute engine compressor pressure. Maximum compressor pressure acting on the diaphragm 112 and member 110 is adjusted in accordance with the pressure relief valve 120 which includes the ball 122, spring 124 and adjustable plug 126. Thus the maximum fuel flow to the engine due to compressor discharge pressure is also determined by the adjustment of plug 126.

Flow of fuel to the engine 12 from the chamber 128 into which it is pumped by the pump 50 is through the fixed restriction 130, conduit 132, fixed restriction 134, valve assembly 38, conduit 136, cut-off and manifold drain structure 40 to engine fuel conduit 82. The fuel flow through the restriction 130 includes both fuel $W_f$ metered to the engine 12 and fuel $q$ used for governing the engine and bypassed back to the pump 50 through the governing valve 56 and the throttle valve assembly 46 to conduit 106. The fuel $q$ passes through the fixed restriction 130, the fixed restriction 138 and the variable orifice 140 under control of the governing lever 58 and valve 56 before passing to the throttle valve assembly 46.

The throttle valve assembly 46 includes the valving orifice 142, valve member 144, and the springs 146 and 148. The throttling valve assembly 46 functions to maintain the pressure drop across the valve orifice 140 constant at all times. Thus if the governing valve 56 is more fully opened the pressure drop thereacross will be reduced so that the throttle valve member 144 will be caused to move upwardly and open the valve orifice 142 a greater degree. Opening the valve orifice 142 will restore the pressure drop across the governing valve 56. Similarly if the lever 52 in the accelerating system permits more of the total fuel pumped to be bypassed back to the pump 50 through orifice 54, the pressure in the chamber 150 will be increased and the orifice 142 opened accordingly.

Adjustable plug 152 is provided to vary the spring forces acting on the throttle valve assembly 46 to compensate for the effects of fuel having different characteristics such as density on the operation of the throttle valve assembly. A similar adjustable plug 154 and spring 156 are provided in conjunction with the governing valve 56 to stabilize the governing action of the fuel control.

The fuel pressure drop across the orifice 130 due to fuel $W_f$ and fuel $q$ flowing therethrough will be proportional to $(W_f+q)^2$. Similarly since fuel $W_f$ flows through fixed restriction 134 the pressure drop across the restriction 134 will be proportional to $W_f^2$. The pressure drop across the restriction 138 which will be controlled by governing valve 56 will be proportional to $q^2$ since the fuel flow therethrough is $q$.

Thus it will be seen that the pressure drop across diaphragm 158 in the acceleration system 14 will be proportional to $W_f^2$ while the pressure drop across diaphragm 160 will be proportional to $(W_f+q)^2+W_f^2$ and the pressure drop across diaphragm 162 will be proportional to $(W_f+q)^2+q^2$. Since the diaphragms 158, 160 and 162 are connected by means of the reinforcing members 164, 166 and 168 to the force transferring member 170 by convenient means, such as the screws 172, and since the force transfer member 170 is secured by pivot means 174 to lever 52 the lever 52 is positioned in accordance with the fuel flow $q$.

The $W_f^2$ force due to diaphragm 160 is cancelled by the $W_f^2$ force due to diaphragm 158 and the $(W_f+q)^2$ force due to diaphragm 160 is cancelled by the $(W_f+q)^2$ force due to diaphragm 162 leaving only the force proportional to $q^2$ acting on the lever 52 at point 174. Thus lever 52 is positioned in accordance with fuel flow $q$ or more particularly by a force proportional to $q^2$. Of course at this time the compressor pressure will also act on the lever 52 through the diaphragm 112.

Thus taking the moment of the forces acting on lever 52 about the pivot means 100, it will be seen that the following equation results $$P_1 A_1 L_1 = (W_f + q)^2 \times A_2 L_2 - W_f^2 (A_3 - A_2) L_2 - q^2 \times A_4 L_2$$

where $A_1$, $A_2$, $A_3$ and $A_4$ are equal to the area of diaphragms 112, 160, 158 and 162 respectively, so that if the areas of the diaphragms and distances $L_1$ and $L_2$ are properly chosen the fuel flow $W_f q$ will be proportional to compressor discharge pressure $P_1$.

Further as will become more evident subsequently when the governing lever 58 is against either the minimum fuel metering abutment 176 or the maximum fuel metering abutment 178 as during acceleration and deceleration of engine 12 that the fuel will be metered to the engine 12 only in accordance with engine compressor pressure $P_1$ since $q$ will be constant at this time due to the constant opening of orifice 140 and the constant pressure maintained thereacross by the throttle valve assembly 46.

The governing apparatus 16 operates in conjunction with the speed sensors 18 and 20. Governing apparatus 16 is sensitive to both fuel control drive or compressor speed and power turbine speed through the respective speed sensors 18 and 20 and functions to maintain these speeds between predetermined limits at selected governing speed.

Speed sensor 18 functions in conjunction with the positive delivery pump 50 and senses the fuel control speed or the speed of the compressor of engine 12 to which drive shaft 74 is mechanically connected. Speed sensor 18 includes a chamber 180 in which the rotor 182 is positioned for rotation by the drive shaft 74 through shaft 184. Rotor 182 is provided with a centrifugally unbalanced valve 186 therein operable to open or close a valving orifice 188 in accordance with the speed of rotation of the shaft 184 in the usual manner wherein the output pressure of the speed sensor 18 in chamber 128 is proportional to the speed of rotation of shaft 184. The pressure drop across the speed sensor 18 between the pressure in the chamber 180 provided by the pressure of pump 50 in chamber 190 as dropped across the fixed restriction 192 and pressure in chamber 128 is placed across the diaphragm 194 in the governing apparatus 16 to provide fuel control governing as will be considered in more detail subsequently.

The speed sensor 20 is similar to the speed sensor 18 in that a pressure differential between the pump pressure in chamber 196 and speed sensor pressure in chamber 198 is applied across diaphragm 200 in the power turbine reset mechanism 28 to vary the pressure across the diaphragm 202 in the governing apparatus 16 as will be considered in more detail subsequently. The rotor 204 of the speed sensor 20 is driven through drive shaft 206 which in turn is mechanically connected to the engine power turbine by convenient mechanical linkage 76. Again the centrifugally unbalanced valve 208 functions to open or close the valve orifice 210 to produce the pressure drop between chambers 196 and 198 which is proportional to the speed of rotation of the power turbine.

Chamber 198 is connected to chamber 128 through the fixed restriction 212 and to the chamber 214 through the fixed restriction 216. Thus variation in the speed of the power turbine as well as variation in the speed of the fuel control drive or compressor speed will vary the pressure in chamber 128. The restriction 210 can of course produce a substantially reduced speed of rotation of shaft 74 and thus reduce the pressure in chamber 128 substantially while restrictions 212 and 216 have only minor effect on pressure in chamber 128.

The valve 22 includes the hat-shaped valving member 218 which is biased to the left in FIGURE 1 by means of spring 220 and is operable to open or close the valving ports 222 in member 224 in accordance with the pressure in chamber 226 which is vented to the chamber 128.

Valve 22 is operable to maintain operating pressure in the fuel control 10 even though the speed of the fuel control and the power turbine restrict the flow of fuel through the speed sensors 18 and 20 to a degree which would otherwise prevent sufficient fuel from being metered through the fuel control 10. The pressure differential between chamber 190 and chamber 226 at which the valve 22 will open the metering orifices 222 may be varied by adjustment of the plug 230.

In addition the pump pressure in chamber 190 is maintained below a predetermined pressure to further regulate the pressure in chamber 128 by means of a pressure relief valve assembly 232. Pressure relief valve assembly 232 includes valve orifice 234, valve member 236, and spring 238. Thus orifice 234 is maintained closed by valve 236 under urging of spring 238 while pressure in chamber 190 is below the predetermined value therefor. If pressure in chamber 190 due to operation of pump 50 exceeds the predetermined value the valve member 236 is opened in opposition to spring 238 to bypass the fuel in chamber 180 back to the low return chamber 240 and to the pump input through conduit 242.

Governing apparatus 16 includes the lever 58, minimum and maximum fuel flow stops 176 and 178, diaphragms 194 and 202 and valve 56, operable in conjunction with levers 86 and 88 previously discussed, and the maximum and minimum stops 244 and 246 for limiting the position of the lever 86. Lever 86 is rigidly secured to shaft 248 which in turn is rigidly secured to the cam 250. Thus on movement of the lever 86 shaft 248 is rotated to rotate cam 250 and position the cup 252 to vary the bias applied to lever means 58 by means of the spring 254. The positioning of the lever 86 thus determines the selected governing speed of the engine 12 by establishing in conjunction with the diaphragms 194 and 202 the position of the governing valve 56.

It will be evident that the lever 58 may be positioned between the minimum and maximum fuel flow abutments 176 and 178 in accordance with the balance between the force due to spring 254 applied to governor lever 58 through member 256, the force applied to governor lever 58 due to the pressure differential across diaphragm 194 through member 256 which is rigidly secured to the diaphragm reinforcing member 258 and the force of spring 260 operable between the governor lever 58 and the cup-shaped retainer 262 therefor which is supported by the diaphragm 202. With the governor lever 58 positioned between the abutments 176 and 178 which would indicate operation of engine 12 at a selected governing speed if the engine compressor speed increases the pressure differential across the speed sensor 18 will increase and there will be a resultant upward force applied to the governor lever 58 through diaphragm 194 and member 256 to move the governor lever toward the minimum fuel stop 176 and open the governor valve 56 to increase $q$ fuel flow and thus decrease $W_f$ fuel flow and reduce engine speed. Obviously the reverse action will take place on a decrease of compressor speed.

In a similar manner with the governor lever between the abutments 176 and 178 if the power turbine speed increases the pressure drop between chambers 196 and 198 will increase so that diaphragm 200 will be moved downward in opposition to the biasing spring 264 to open metering orifice 266 wider and increase the pressure in chamber 268 whereby an increase in net upward pressure on the governor lever 58 is provided through spring 260 to move lever 58 toward the minimum fuel abutment 176 and thus reduce fuel flow to the engine as before. Again a reduction in the speed of the power turbine 68 will have the reverse effect on the fuel metered to the engine.

During acceleration and deceleration the lever 86 is moved so that the spring 254 forces the lever 58 to engage abutment 176 or 178. Thus during acceleration and deceleration the governor valve 56 is held in a predetermined position as previously indicated so that during acceleration and deceleration fuel flow to the engine is changed only in accordance with compressor discharge pressure.

That is to say that during acceleration or deceleration fuel flow is changed in accordance with compressor discharge pressure except of course for the operation of the overspeed controls and manual setting of lever 88. Further, during acceleration and deceleration valve 56 does not move and will therefore not change fuel flow. Thus during acceleration and deceleration $q$ or the fuel return to the pump through valve 56 will remain constant particularly in view of the constant pressure maintained in chamber 150 by valve 46. Also, the changes in pressure in chambers 128 and 190 will either not be effective to remove the lever 58 from the maximum or minimum stop or will be cancelled out due to the diaphragms through which forces are applied to lever 52. Thus the imputs to lever 54 at point 174 are constant when $q$ is a constant since as pointed out above the opposing $W_f$ forces cancel as may the forces due to the pressure in chamber 128.

In other words, as indicated above fuel is pumped by pump 50 in the fuel control 10 in excess of engine fuel requirements at all times. The fuel in excess of the requirements of the engine 12 pumped by pump 50 is returned to the pump 50 through movement of lever 52 to vary the orifice 54 in accordance with compressor discharge pressure at all times. In addition the fuel returned to the pump 50 is modulated by the governing lever 58 through independent control of the governing valve 56 to maintain desired engine governing between predetermined limits at any engine governing speed setting of lever 86.

The fuel $W_f$ passing through fixed restriction 134 is passed through throttle valve assembly 38, conduit 136 and the cut-off and manifold drain structure 40 as previously indicated. The cut-off and manifold drain structure 40 includes the lever 94 rigidly secured to the shaft 270 which in turn is rigidly connected to cam 272. Thus rotation of lever 94 causes rotation of cam 272 to move the cut-off valve 274 within opening 276 to cut off all fuel flow through passage 136 to engine fuel line 82. Cut-off valve 274 is biased to the right as shown in FIGURE 1 by the arcuate leaf spring 278 which is concentric with shaft 270 and engaged with the left end 280 of valve 274.

On closing of the cut-off valve 274 the valve sleeve 282 is moved to the right, as shown in FIGURE 1, in opposition to the bias of spring 284 which is adjusted by the adjustable plug 286. On movement to the right of the valve sleeve 282 under urging of the cut-off valve 274 which seats on the valve sleeve 282, the conduit 288 is opened to the engine manifold through conduit 82 whereby the engine manifold is drained through the restriction 290 to the engine fuel supply. Thus on restarting the engine the manifold will be substantially dry. The fixed restriction 290 is relatively small so that draining of the manifold is not complete on momentary engine cut-off.

In addition to the primary fuel metered to the engine, fuel is metered to the engine through the starting compensating mechanism 36 which provides additional fuel for the engine in accordance with engine temperature. The starting compensating apparatus 36 comprises the temperature sensitive probe 78 including a plurality of bi-metallic discs 294 sleeved over the rod 296 which is biased upward by means of spring 298 acting between the hat-shaped member 300 and the retaining disc 302 secured to the shaft 296. Sleeve 304 having a plurality of orifices 306 therein is exposed to engine temperature, such as burner input air temperature. On movement of shaft 296 the lever 308 which is pivotally connected to the shaft 296 is rotated to rotate the shaft 310 and valve 312 secured thereto in accordance with the air temperature. Valve 312 is operable on rotation of shaft 310 to permit a variable amount of fuel to flow between the conduit 314 connected to chamber 128 and conduit 316 which is connected to conduit 136 between the throttle valve assembly 38 and the cut-off valve 274. Throttle valve assembly 38 is fully open except during cold starts or at very low speeds at which time fuel is metered therethrough to maintain system pressure.

Valve 38 is not fully open on cold starts since engine speed at such times is relatively low so that the pressure differential between chamber 128 and passage 136 is insufficient to overcome the action of the biasing spring of valve 38.

A second temperature compensating apparatus 34 is provided to sense burner input or similar temperature and also includes a temperature probe 80 having bimetallic discs 318 mounted on a shaft 320 within sleeve 322 having openings 324 therein. Again the shaft 320 is urged upwardly, as shown in FIGURE 1, by means of the spring 326 acting between the hat-shaped member 328 and the retaining disc 330 of temperature probe 80. The temperature compensating apparatus 34 is operable to regulate the compressor discharge pressure $P_1$ in accordance with burner input temperature by means of controlling the orifice 332 in accordance with the position of the valving end 334 of the shaft 320. Thus the compressor discharge pressure after passing through the fixed orifice 336 passes into conduit 114 and subsequently into chamber 340 to control the position of the diaphragm 112 but is reduced in accordance with the opening of orifice 332.

The power turbine overspeed cut-off mechanism 24 includes a diaphragm 342 having the pressure differential created by the power turbine speed sensor 20 thereacross, a snap acting leaf spring 344 fixed at opposite ends in recesses 346 and 348 and adjusted by the adjustable plug 350. The valving member 352 is urged into a closed position with respect to valve orifice 354 by means of spring 356 as long as spring 344 is in the position shown.

Thus in operation when the pressure drop across the speed sensor 20 is such as to indicate excessive power turbine speed the pressure difference across the diaphragm 342 and the composite member 358 exceeds a predetermined value. The diaphragm and member 358 which engages the spring 344 by means of portion 360 is moved upwardly, as shown in FIGURE 1, against the bias of spring 362 to move the snap acting spring 344 over center. The valving member 352 is thereby moved upwardly to open the valving orifice 354.

Opening of the valving orifice 354 admits the high pressure of the pump into conduit 364 which applies the high pressure to the left hand end of the cut-off valve 274 to move the cut-off valve 274 to the right in FIGURE 1 and cut off the fuel flow to the engine through conduit 82. The restriction 366 is small so that the high pressure in conduit 364 is permitted to maintain the cut-off valve 274 closed as long as the valving orifice 354 is open with the spring 344 in an over-center position.

A manual reset lever 368 is secured by pivot means 370 to the fuel control 10 and is operable to move the reset plunger 372 into chamber 374 against the bias of spring 376 to reset the spring 344 after the overspeed has been corrected to again close the orifice 354.

In addition as previously indicated turbine over-temperature apparatus 26 is provided in connection with the fuel control 10. The turbine over-temperature apparatus includes a torque motor 378 responsive to an electrical signal proportional to turbine temperature as sensed by temperature probe 84 over conductors 380 to open the servo-valve 382 to bleed the relatively high pressure in chamber 214 into the lower pressure of chamber 128 by means of conduit 386. Thus on turbine over temperature the pressure in chamber 214 is substantially lowered and diaphragm 200 is moved down to permit the relatively high pressure in chamber 190 to be felt in chamber 268 through conduit 388 so that the governor is reset toward a minimum fuel flow schedule.

In conjunction with the turbine over-temperature apparatus 26 a check valve 390 and biasing spring 392 therefor and a fixed restriction 394 are provided to permit rapid increases in pressure in the chamber 268 and a relatively slow decrease therein. Thus the governing mechanism is quickly responsive to opening of the servo-valve 382 and will remain responsive thereto for a predetermined period.

The turbine over-temperature resetting apparatus as indicated is capable of resetting the governor lever 58 due to turbine over temperature to restrict fuel flow to the engine to a fuel flow below idle requirements thereof at any given governor speed setting as determined by the position of lever 86. To prevent such resetting of the governor lever 58 the maximum reset adjustment mechanism 30 is provided in conjunction with the governor apparatus 16.

The maximum reset adjustment mechanism 30 includes the lever 396 which is pivotally mounted on the pivot means 398 for governor lever 58 and which is in abutment with an adjustable stop 400. Thus the lever 396 may be adjusted by the stop 400 to limit the possible resetting of the governor lever 58 with the lever 86 in the maximum fuel flow or upper position through limiting movement of the cup retainer 262 of spring 260.

The one-way link 92 connecting the levers 86 and 90 in conjunction with the shaft 402, cam 404 and adjustable cup retainer 406 for spring 264 prevents resetting of the governor lever 58 at fuel flows below idle fuel requirements at any position of the lever 86 other than maximum fuel flow position thereof. Thus with the one-way connecting link 92 the lever 90 may be moved downwardly independently of the lever 86 but upward movement of the lever 90 is restricted by the position of the lever 86. Physically the connecting link 92 comprises a hollow sleeve 408 pivoted to lever 90 in which the shaft 410 pivoted to lever 86 is positioned. Spring 412 is provided acting between the sleeve 408 and shaft 410 to bias the shaft 410 out of the sleeve 408.

The modification 10a of the fuel control 10 illustrated in FIGURE 7 is the same as the fuel control illustrated in FIGURE 1 in most respects. Therefore the same reference characters have been used to designate the same elements in the fuel control illustrated in FIGURES 1 and 4.

Figure 4:
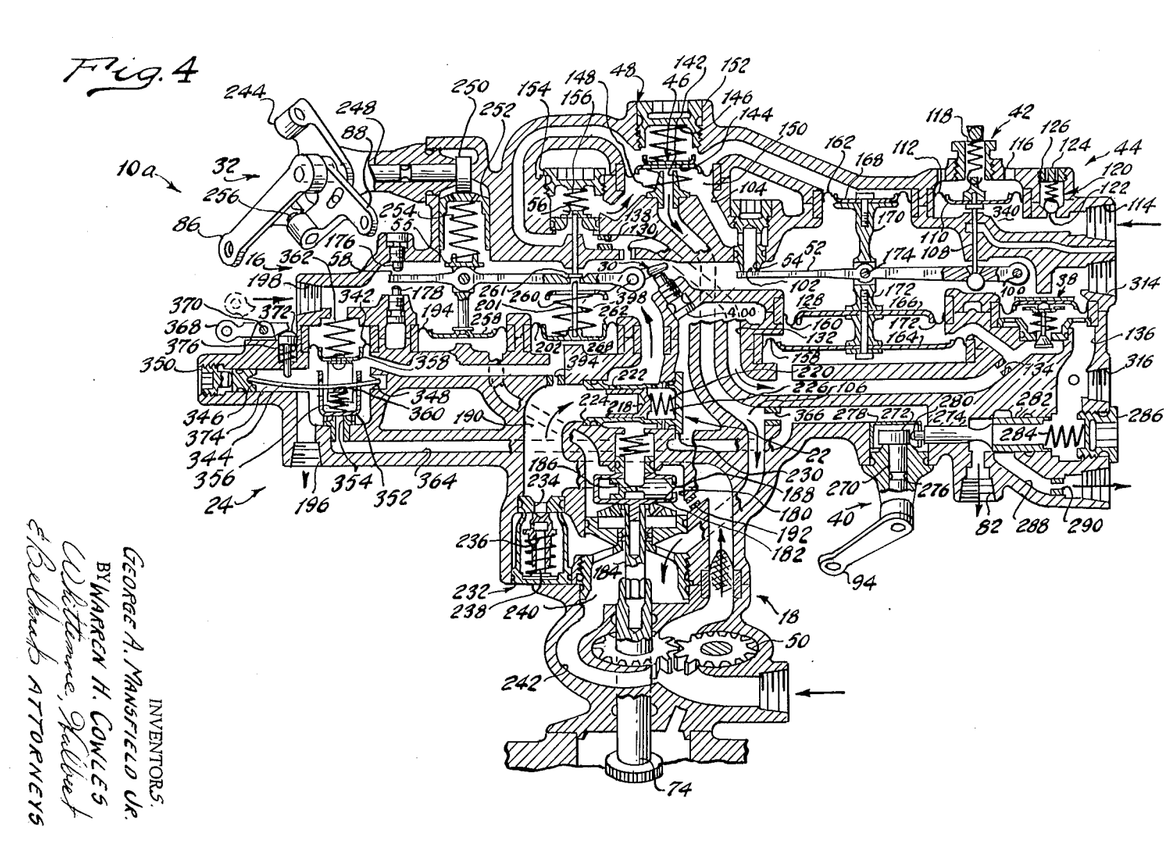
FIGURE 4 is a diagrammatic illustration of a modification of the fuel control of FIGURE 1.

The fuel control 10a illustrated in FIGURE 4 has been simplified in the interest of economy by modifying the power turbine governing and maximum reset adjustment means 28 and 30 provided in the fuel control 10 as shown in FIGURE 1 and deleting the over-temperature apparatus 26 found in the fuel control 10.

Physically the fuel control 10a is simplified by deleting the lever 90, cam 404, speed error diaphragm 200, torque motor 378 and servo valve 382 together with the apparatus associated therewith as illustrated in FIGURE 1. In addition the fuel conduits of the fuel control 10a are arranged to apply the pressure differential from power turbine speed sensor 20 (not shown in FIGURE 4) which is the pressure difference between the pressure in chamber 268 and chamber 128 to the diaphragm 202 which in the modified fuel control 10a includes the stem 201 secured thereto for movement therewith. Also, the reset spring 260 no longer engages the governor lever 58 in the fuel control 10a but is loaded to a given power turbine speed setting with the reset adjustment lever 396 of fuel control 10.

Thus when power turbine over-speed occurs the pressure difference across diaphragm 202 overcomes the spring load of spring 260 whereby the stem 201 is moved upward to engage the governor valve 56 and open the governor valve independent of governor lever 58 position, to bypass more fuel back to the pump 50 and thereby reduce the engine speed. The opening of the governor valve 56 is stopped by abutment of the head 261 thereof with the fuel control housing at the maximum governor valve opening.

In considering the overall operation of the fuel control 10 reference is made to FIGURE 4 of the drawings. The fuel control 10 will be assumed to be operating at governed speed as set by the position of lever 86 so that governor lever 58 is positioned between the abutments 176 and 178. At this time the power turbine governing structure 28 and the maximum reset adjusting means 30 are positioned to prevent resetting of the governor lever 58 to a point where less than minimum fuel flow requirements at the governed speed would be provided. In addition the turbine over-temperature apparatus 26 is in a condition to maintain the servo-valve 382 closed. The temperature compensating apparatus 34 is positioned so that it compensates the compressor discharge pressure in conduit 114 for temperature variations and the cold start compensating mechanisms 36 in conjunction with the valve 38 is permitting bypass of fuel around the valve 38 through conduits 314 and 316 as required for low speed and cold start operation and the lever 94 is moved to open communication between the conduits 136 and 82 so that the metered fuel is passed to the engine 12.

The structure 42 for reducing compressor pressure to absolute pressure is adjusted to substantially balance atmospheric pressure at the operating altitude of the fuel control 10, while the structure 44 limits maximum compressor discharge pressure acting on the fuel control 10. The density compensating structure 48 provides density compensation for the fuel control 10.

With the fuel control 10 operating in this condition fuel pumped through pump 50 is metered to the fuel control through speed sensor 18 in accordance with the speed of the compressor turbine 66. Part of the fuel metered in the fuel control is passed through restriction 130 and restriction 138 through governing valve 56 and back through throttle valve assembly 46 to the input side of the pump 50. The quantity of fuel thus returned to the pump 50 is changed in accordance with the position of the governing lever 58 between the minimum and maximum abutments 176 and 178 since the pressure in chamber 150 is maintained substantially constant. The remainder of the fuel passed through the orifice 130 passes through orifice 134, valve 38 and passage 136 to fuel supply conduit 82 and burners 64 of engine 12.

During operation of the fuel control 10 at governed speeds, an increase in the compressor turbine speed will produce a decrease in pressure on the output side of the speed sensor 18 whereby the governor lever 58 will be caused to move toward the minimum fuel flow abutment 176 and the valve 56 will be opened to return more of the pumped fuel to the pump so that less of the pumped fuel will be metered to the engine 12 and the speed of the compressor turbine will thus be reduced. Conversely, if the speed of the compressor turbine decreases the governor lever 58 is moved toward the maximum fuel flow abutment 178 to increase the fuel flow to the engine 12 and the speed of the compressor turbine.

During this governing operation a portion of the fuel pumped by pump 50 into the chamber 128 is returned through the valve orifice 54 in accordance with the position of the lever 52. The lever 52 as indicated previously is positioned in accordance with the compressor discharge pressure acting on diaphragm 112 to provide fuel flow proportional to compressor discharge pressure.

Should the governing lever 58 engage either the minimum fuel flow abutment 176 or the maximum fuel flow abutment 178 as during either acceleration or deceleration the return fuel flow through the valve 46 will be changed only in accordance with the position of the lever 52 or in other words during acceleration or deceleration the fuel flow metered to the engine 12 will be metered to the engine 12 in accordance with compressor discharge pressure. At governed speeds the fuel metered to the engine 12 is changed by compressor discharge pressure as well as by the parameters positioning lever 58.

Overspeed of the power turbine 68 will be sensed by the speed sensor 20 to actuate the power turbine over speed cut-off mechanism 24 and close the fuel flow cut-off valve 274. The turbine over-temperature apparatus 26 provides protection by moving the governor lever 58 toward the minimum fuel flow abutment 176 in response to opening of the servo-valve 382 on turbine overheating.

With the fuel control 10a illustrated in FIGURE 4 the turbine over-temperature may be sensed by a separate pnumatic turbine over-temperature sensor positioned in the compressor discharge conduit before the compressor discharge pressure is applied to diaphragm 112. This allows the deletion of the torque motor 378 and servo valve 382 included in the fuel control 10 illustrated in FIGURE 1.

While one embodiment of the invention and a modification thereof have been disclosed in detail, it will be understood that other embodiments and modifications thereof are contemplated. All embodiments and modifications of the invention which suggest themselves from the above disclosure are intended to be included within the scope of the invention as defined in the appended claims.

What we claim as our invention is:

1. A fuel control for metering fuel to a turbine engine or similar device comprising a constant delivery pump for pumping fuel under high pressure in excess of engine requirements at all times, an acceleration system operably associated with the pump and responsive to engine compressor pressure for returning a portion of the pumped fuel back to the pump to regulate the quantity of fuel metered through the fuel control in accordance with engine compressor pressure at all times, governing apparatus operably associated with the pump and acceleration system responsive to engine compressor speed and engine power turbine speed for modulating the fuel metered to the engine in accordance with engine power turbine speed and engine compressor speed between predetermined engine compressor speeds, including a governing valve positioned to control fuel flow in said fuel control, minimum and maximum fuel flow abutments and a level pivotally mounted at one end and movable between the minimum and maximum fuel flow abutments in engagement with the governing valve to position said governing valve and a throttle valve assembly operably associated with the pump, governing apparatus and acceleration system including a valve orifice, diaphragm means, a valve plate secured around the periphery thereof to said diaphragm means, resilient means adjustably biasing said valve plate toward said valve orifice, and means for moving the valve plate to maintain a substantially constant pressure differential across the governing valve.

2. A fuel control for a turbine engine comprising a pump for pumping fuel in excess of engine requirements at all times, an acceleration system operably associated with the pump responsive to a first engine parameter for returning a portion of the pumped fuel back to the pump to regulate the quantity of fuel metered through the fuel control in accordance with the first engine parameter at all times and governing apparatus operably associated with the pump and acceleration system including a governing valve jointly responsive to a second and third engine parameter for modulating the fuel metered to the engine in accordance with the second and third engine parameters between predetermined values of one of said second and third engine parameters and a throttle valve assembly operably associated with the pump, acceleration system and governing apparatus including a throttle valve and means for moving the throttle valve to maintain a substantially constant pressure differential across the governing valve.

3. A fuel control for metering fuel to a turbine engine or similar device from a fuel reservoir including a first fuel conduit having a first and second fuel metering restriction therein, a constant volume pump for pumping fuel always in excess of that required by the engine into said conduit, means between said pump and said first restriction for bypassing a predetermined quantity of the pumped fuel which is in excess of the engine requirements back to the input of the pump in accordance with engine compressor pressure, means connected to said conduit between said first and second metering orifices for modulating the fuel passing through said first orifice in accordance with engine speed at speeds between predetermined limits at any selected governing speed including a second fuel conduit connected to said first fuel conduit between said first and second orifices and having a third fixed orifice and a variable governing orifice therein, and a throttle valve between said variable orifice and the input side of said pump operable to maintain the pressure drop across the variable orifice substantially constant.

4. A fuel control for metering fuel to a turbine engine or similar device from a fuel reservoir including a first fuel conduit having a first and second fuel metering restriction therein, a pump for pumping fuel always in excess of that required by the engine into said conduit, means between said pump and said first restriction for bypassing a predetermined quantity of the pumped fuel which is in excess of the engine requirements back to the input of the pump in accordance with a first engine parameter, means connected to said conduit between said first and second metering orifices for modulating the fuel passing through said first orifice in accordance with a second engine parameter at second parameter values between predetermined limits at any selected governing second parameter value including a second fuel conduit connected to said first fuel conduit between said first and second orifices and having a third fixed orifice and a variable governing orifice therein, and a throttle valve between said variable orifice and the input side of said pump operable to maintain the pressure drop across the variable orifice substantially constant.

5. Structure as set forth in claim 4 wherein the means for bypassing a predetermined quantity of the pumped fuel which is in excess of the engine requirements back to the input of the pump includes a lever pivotally mounted at one end and having a valve surface on the other end, a valve orifice adjacent said valve surface variable in accordance with the pivotal position of said lever and means secured to said lever for pivoting the lever about one end thereof in accordance with engine compressor pressure including means secured to the lever responsive to a division of the fuel pumped between fuel returned to the pump and fuel metered to the engine for positioning the lever in accordance with said division.

6. Structure as set forth in claim 4 wherein the means for modulating the fuel passing through said first orifice further includes a governing valve positioned to control flow through said governing orifice, minimum and maximum fuel flow abutments, a lever pivotally mounted at one end and movable between the minimum and maximum fuel flow abutments in engagement with the governing valve to position said governing valve, means engaged with said lever responsive to engine compressor speed for positioning the lever between maximum and minimum abutments and means for adjustably biasing the lever in one direction to select engine governing speeds.

7. Structure as set forth in claim 6 and further including means engaged with said lever for urging the lever toward the minimum fuel flow abutment in response to engine power turbine overspeed.

8. Structure as set forth in claim 4 wherein the throttle valve includes a valve orifice, diaphragm means, a valve plate secured around the periphery thereof to said diaphragm means, resilient means adjustably biasing said valve plate toward said valve orifice and means for moving the valve plate to maintain a substantially constant pressure differential across the variable governing orifice.

9. A fuel control for metering fuel to a turbine engine or similar device comprising a fuel conduit, a hydraulic speed sensor in said fuel conduit and a constant delivery pump for pumping fuel under high pressure into said conduit upstream of the speed sensor in excess of engine requirements at all times, and a valve in the fuel conduit after the speed sensor operable in conjunction with the pump to provide a predetermined minimum fuel pressure in said conduit comprising a cylindrical sleeve having transverse openings therethrough, the interior of which is in communication with fuel at pumped pressure and the exterior of which is in communication with fuel at the output pressure of the speed sensor, a hat-shaped piston reciprocally mounted within said cylinder and means biasing the piston in one direction to close said transverse openings through said cylinder as long as the predetermined pressure drop between the interior of the cylinder and exterior of the cylinder is not exceeded, a throttle valve assembly, an acceleration system operably associated with the pump and throttle valve assembly responsive to engine compressor pressure for returning a portion of the pumped fuel back to the pump to regulate the quantity of fuel metered through the fuel control in accordance with engine compressor pressure at all times, and governing apparatus operably associated with the pump, acceleration system and throttle valve assembly responsive to engine compressor speed and power turbine speed for modulating the fuel metered to the engine in accordance with engine power turbine speed and engine compressor speed between predetermined engine compressor speeds.

10. A fuel control for metering fuel to a turbine engine or similar device comprising a constant delivery pump for pumping fuel under high pressure in excess of engine requirements at all times, a throttle valve assembly, an acceleration system operably associated with the pump and throttle valve assembly responsive to engine compressor pressure for returning a portion of the pumped fuel back to the pump to regulate the quantity of fuel metered through the fuel control in accordance with engine compressor pressure at all times, governing apparatus operably associated with the pump, acceleration system and throttle valve assembly responsive to engine compressor speed and power turbine speed for modulating the fuel metered to the engine in accordance with engine power turbine speed and engine compressor speed between predetermined engine compressor speeds including a governing valve positionable to regulate the engine speed and a pivotally mounted lever movable to determine the position of the governing valve and governor reset apparatus for resetting governing speed on power turbine overspeed including a first diaphragm, resilient means supported by said first diaphragm for applying a force to said lever to vary the position of the governing valve in accordance with the pressure differential across the first diaphragm and means responsive to power turbine overspeed for varying the pressure differential across said first diaphragm in a direction to close the governing valve including a second diaphragm positionable in accordance with power turbine speed to vary the pressure differential across the first diaphragm, a variable bias therefor, and cam means for varying the bias on the second diaphragm for regulating the amount of reset of the governing apparatus due to a particular turbine overspeed.

11. A fuel control for metering fuel to a turbine engine or similar device comprising a constant delivery pump for pumping fuel under high pressure in excess of engine requirements at all times, a throttle valve assembly, an acceleration system operably associated with the pump and throttle valve assembly responsive to engine compressor pressure for returning a portion of the pumped fuel back to the pump to regulate the quantity of fuel metered through the fuel control in accordance with engine compressor pressure at all times, governing apparatus operably associated with the pump, acceleration system and throttle valve assembly responsive to engine compressor speed and engine power turbine speed for modulating the fuel metered to the engine in accordance with engine power speed and engine compressor speed between predetermined engine compressor speed including a governing valve positionable to regulate engine speed and a lever movable to determine the position of the governing valve and governor reset apparatus for providing a maximum governor reset on power turbine overspeed with the fuel control metering maximum fuel including a reset diaphragm, resilient means between the reset diaphragm and lever for positioning the lever in accordance with the position of the reset diaphragm, a pivotally mounted reset lever positionable to limit movement of said reset diaphragm and adjustable abutment means engageable with said reset lever for determining the position of said diaphragm on limiting of movement thereof by said reset lever.

12. A fuel control for metering fuel to a turbine engine or similar device comprising a constant delivery pump for pumping fuel under high pressure in excess of engine requirements at all times, a throttle valve assembly, an acceleration system operably associated with the pump and throttle valve assembly responsive to engine compressor pressure for returning a portion of the pumped fuel back to the pump to regulate the quantity of fuel metered through the fuel control in accordance with engine compressor pressure at all times, governing apparatus operably associated with the pump, acceleration system and throttle valve assembly responsive to engine compressor speed and power turbine speed for modulating the fuel metered to the engine in accordance with engine power turbine speed and engine compressor speed between predetermined engine compressor speeds and turbine over-temperature apparatus operably associated with the governing apparatus responsive to turbine over-temperature for resetting the governing apparatus to provide minimum fuel flow through the fuel control on turbine over-temperature including means for producing an electrical signal representative of turbine temperature, a torque motor operable in accordance with the developed electrical signal and a servo valve actuable by said torque motor operably associated with the governing apparatus for resetting the governing apparatus to provide minimum fuel flow through the fuel control on actuation thereof.

References Cited by the Examiner
UNITED STATES PATENTS

| | | | |
|---|---|---|---|
| 2,324,100 | 7/1943 | Maynard | 236—101 |
| 2,591,118 | 4/1952 | Bent | 137—625.67 |
| 2,668,416 | 2/1954 | Lee | 60—39.28 |
| 2,720,752 | 10/1955 | Chandler | 60—39.28 |
| 2,822,666 | 2/1958 | Best | 60—39.28 |
| 2,836,957 | 6/1958 | Fox | 60—39.28 |
| 2,929,616 | 3/1960 | Fox | 137—36 |
| 2,941,358 | 6/1960 | Kuzmitz | 60—39.28 |
| 2,943,447 | 7/1960 | Davies | 60—39.28 |
| 2,946,189 | 7/1960 | Baseford | 60—39.28 |
| 2,951,493 | 9/1960 | Green | 137—36 |
| 2,958,190 | 11/1960 | Rogers | 60—39.28 |
| 2,959,002 | 11/1960 | Best | 60—39.28 |
| 2,968,151 | 1/1961 | Abraham | 60—39.28 |
| 2,984,069 | 5/1961 | Saville | 60—39.28 |
| 3,021,674 | 2/1962 | Zeisloft | 60—39.28 |
| 3,032,987 | 5/1962 | Taylor. | |

(Other references on following page)

UNITED STATES PATENTS

| | | | |
|---|---|---|---|
| 3,034,583 | 5/1962 | Best | 60—39.28 |
| 3,068,648 | 12/1962 | Fleming | 60—39.28 |
| 3,073,115 | 1/1963 | Cowles | 60—39.28 |
| 3,076,311 | 2/1963 | Johnson | 60—39.28 |
| 3,078,873 | 2/1963 | Stockett | 137—625.67 |
| 3,131,750 | 5/1964 | Turner | 60—39.28 |
| 3,132,804 | 5/1964 | Larson | 236—101 |

OTHER REFERENCES

Woodward: "Gas Turbine Engine Governing Bulletin 4004B," Woodward Governor Co., Rockford, Ill., 13 pages, pages 11–13 relied on.

JULIUS E. WEST, *Primary Examiner*.

ABRAM BLUM, SAMUEL LEVINE, MARK NEWMAN, *Examiners*.